March 14, 1961 L. E. SCHAFFER 2,975,282
AUTOMATIC CREDIT CARD ACCOUNTING SYSTEM
Filed Aug. 6, 1957 3 Sheets-Sheet 2
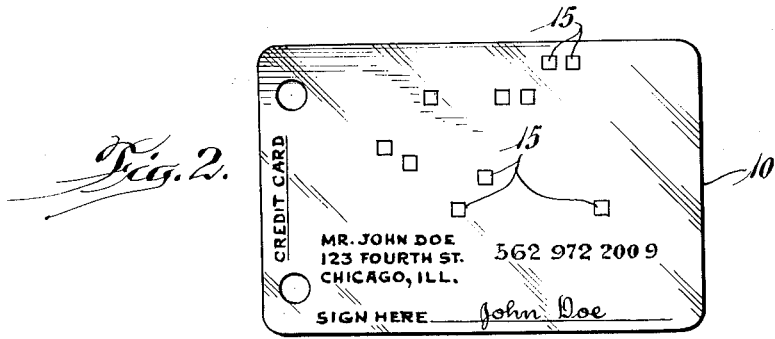
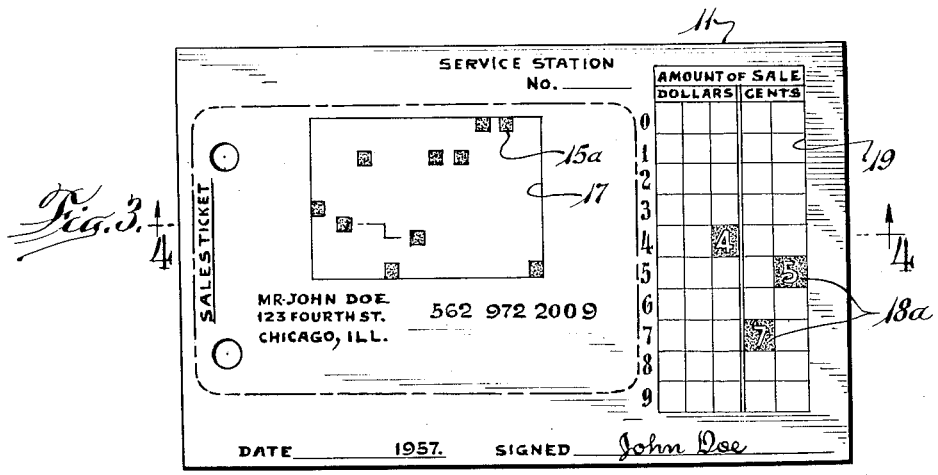
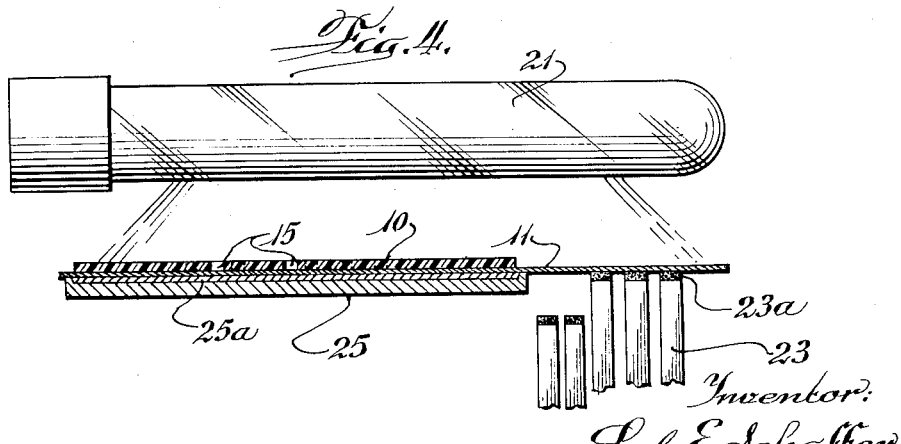
Inventor:
Lyle E. Schaffer
By Everett A. Johnson
Attorney.

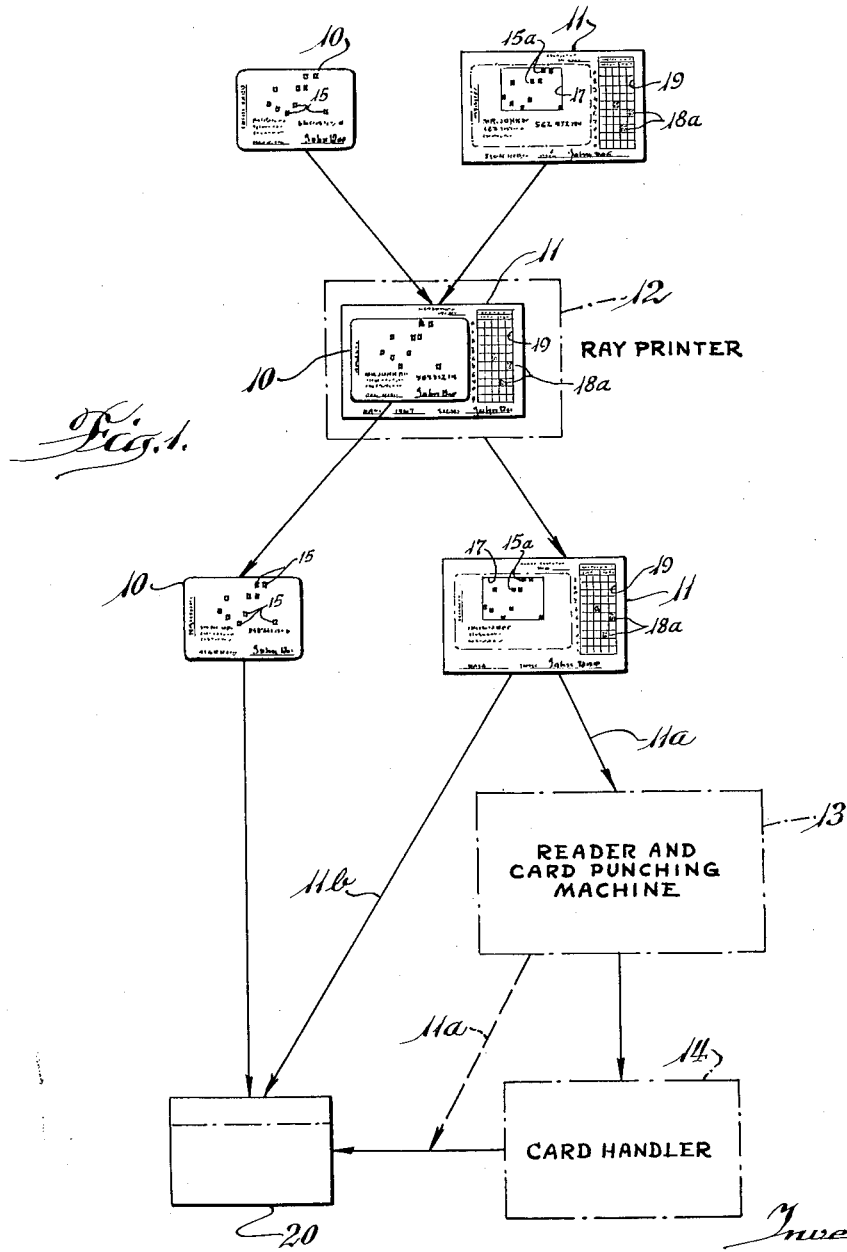

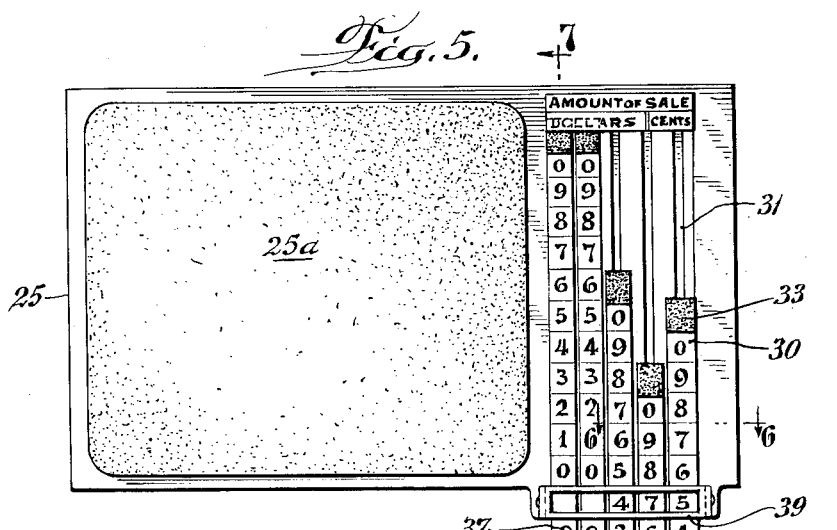
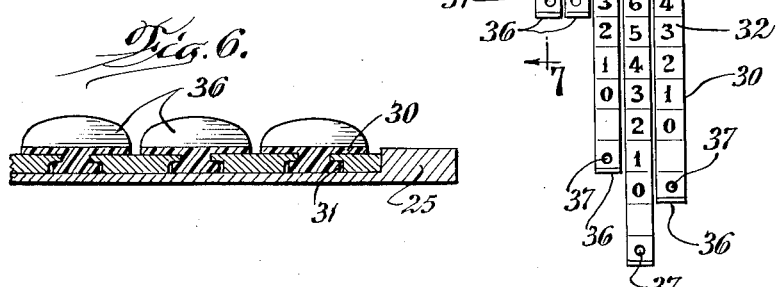
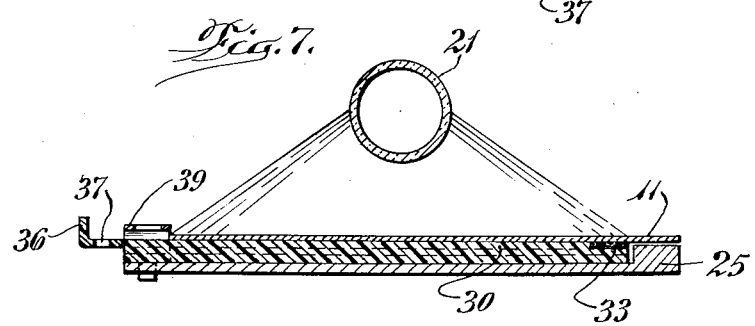
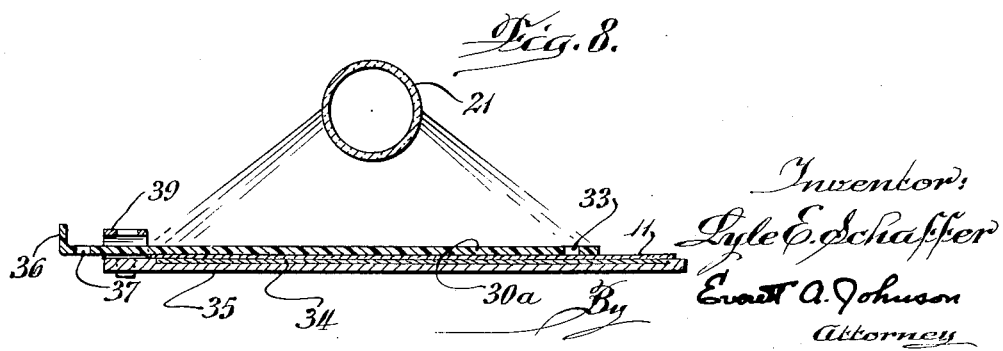

United States Patent Office 2,975,282
Patented Mar. 14, 1961

2,975,282

AUTOMATIC CREDIT CARD ACCOUNTING SYSTEM

Lyle E. Schaffer, Flossmoor, Ill., assignor to Standard Oil Company, Chicago, Ill., a corporation of Indiana Filed Aug. 6, 1957, Ser. No. 676,655

9 Claims. (Cl. 250—65)

This invention relates to improvements in recording and classifying information. More particularly, the invention relates to an improved credit card accounting system.

Heretofore many such systems have been proposed and placed in operation. Some systems have involved automatic card tabulating and handling machines but the intermediate manual and visual operations heretofore necessary have inherently introduced errors. For example, such prior systems had not been entirely satisfactory in that certain operations had been manual and/or visual with the result that errors occurred in preparing original sales tickets or the like, in reading the accounting copy of the sales ticket, and in posting the charges to the appropriate accounts.

It is, therefore, an important object of the invention to provide a system for recording a purchase at a point of sale with a credit card, producing a customer record, and producing a sales ticket adapted for use in operating accounting machines, e.g. a key-punch machine, in conjunction with an electro-mechanical card recording and sorting system. A further object of the invention is to provide a credit card to be carried by the customer which is adapted for use with a ray-sensitive sales ticket. An additional object is to provide a system for recording credit card information on a sales ticket by radiation means. A more specific object of the invention is to provide a complete credit card accounting system which utilizes thermal printing of repetitive information embodied in a credit card.

Another object of the invention is to provide a sales ticket which, after exposure to the source of radiation at the point of sale, may be automatically sorted and recorded at an accounting center. It is also an object of this invention to provide an apparatus located at the point of sale for indexing or dialing in conjunction with the credit card, the coded amount of sale. A further object of the invention is to provide a code-sensing system for reading the coded sales ticket and for converting the information to a punched statistical card, or other machine medium, e.g. magnetic tape.

An additional object of the invention is to provide a point-of-sale printer which is of low cost, is simple and rugged in operation, has relatively few working parts, and is weather-proof. It is a further object of the invention to provide a tabulatable sales ticket which is resistant to grease, gasoline vapors, weather conditions, etc., is adaptable for use in electro-mechanical card reading and handling systems, and which cannot be successfully altered after processing at the point of sale. An additional object is to provide a system for avoiding transcription errors at the point of sale and in the subsequent accounting procedures. These and other objects of the invention will become apparent as the description thereof proceeds.

Briefly, according to the invention, I provide a credit card having perforations which pass radiations onto a sales ticket, or a card having points of radiation-absorbing, heat-producing material which transmit radiations onto a ray-sensitive sheet. Such a product, which is sensitive to heat, is commercially available from Thermo-Fax Sales Corporation and may be used in my invention. In any event, a base sheet or card having a heat- or ray-sensitive film which darkens upon exposure to radiations from a source, such as an infrared lamp, may be used. Typically, such a film includes initially colorless iron compounds which, upon exposure to heat, will turn black.

A credit card and a sales ticket sensitive to such radiations are juxtaposed within a printer apparatus at the point of sale and therein exposed to a source of radiation. Concurrently, the amount of sale is entered on the sales ticket. The sales ticket is signed by the customer, if desired, and the credit card together with a duplicate of the sales ticket is returned to the customer. The sales ticket is forwarded to the accounting center where it is used to prepare conventional punched card records automatically without relying on visual reading or manual key-punching.

Further details and advantages of the system will be described by reference to the accompanying drawings wherein:

Figure 1 is a schematic showing of the over-all system employing the ray-sensitive sales ticket and credit card;

Figure 2 illustrates one form of coded credit card;

Figure 3 is a plan view of a completed sales ticket resulting from my system;

Figure 4 is a fragmentary schematic view of the printer at the point of sale;

Figure 5 is a schematic plan view of another embodiment of the printer;

Figure 6 is a section taken along the line 66 in Figure 5;

Figure 7 is a section taken along the line 77 in Figure 5; and

Figure 8 is a view similar to Figure 7 but employing a perforated slide bar.

Referring to Figure 1, a credit card 10 shown in more detail in Figure 2 and a sales ticket 11, completed example of which is shown in Figure 3, are juxtaposed and inserted into the printer 12. If a card having perforations is used, the card is disposed between the light source 21 and the sales ticket 11. If a credit card having index points of radiation-absorbing, heat-producing material is used, the sales ticket is disposed between the light source 21 and the credit card 10.

The source of radiation 21 is illustrated as comprising an infrared lamp but it is contemplated that other sources of radiation, such as radio-isotopes and incandescent bulbs, for example of the photo flood type, may be used to provide the rays necessary to activate and discolor the ray-sensitive sales ticket 11.

The operator dials or otherwise impresses the amount of the sale on the sales ticket. This may be done, for example, by one of the mechanisms schematically illustrated in Figures 4 and 5. In any event, the sales ticket 11 and the credit card 10 together with the sales information are exposed to the source of radiation so that the repetitive identifying information, such as the account number 15, represented by the index points 15a, are applied to the sales ticket within the box 17 and the coded amount of the sale 18a appears in the box 19. As shown in Figures 1 and 4, the code symbols 18a may be of such design as to be visually identifiable.

In the printer schematically shown in Figure 4, keys (not shown) are depressed to lift the appropriate type-head 23 in accordance with the amount of sale and when the type-heads 23 are lifted they are brought into contact with the lower surface of the sales ticket 11. Each type-head carries a tip 23a of radiation-absorbing, heat-producing material into which the appropirate digit has been engraved. In this way, the bulk of the index points 18a is black with the corresponding number itself being light in color for visual indication of the sales amount (for the customer's benefit) while giving a large index point 18a which facilitates automatic reading at the accounting center. A radiation-absorbing, heat-producing plate 25 may be disposed below the sales ticket 11 when the perforated credit card 10 is employed to assist in developing heat at the exposed portions of the ticket. To accelerate the heat radiation by the back plate 25, I may provide a dark surface 25a containing carbon, iron oxide, and the like. However, this is not absolutely essential and, in addition, can be dispensed with when a credit card carrying the radiation-absorbing, heat-producing index points is used. Likewise, the amount of sale may be recorded on the sales ticket by substituting a stencil arrangement for the subjacent type-heads and backing the stencil, if desired, with the radiation-absorbing, heat-producing plate. Other modifications and arrangements will be apparent to those skilled in the art in view of these general and specific teachings. For example, the backing plate 25 can be omitted or replaced by a screen or a transparent support for the heat-sensitive sheet to be "printed."

Referring to Figures 5–8, another form of a printer 12 is schematically illustrated. This embodiment includes a plurality of slide bars 30 which are mounted in channels 31 as shown in Figure 6. The slide bars 30 include indicia 32 and radiation-absorbing, heat-producing areas 33 which, when positioned by withdrawing the appropriate slide bar 30 to the extent indicated by the last exposed digit, will result in "printing" of the heat-sensitive sales ticket 11.

Alternatively the slide bar 30a may be provided with a perforation 33a and used as illustrated by Figure 8. It will be seen that in the embodiment the rays pass through the perforation 33a in the slide bar 30a impinging, where employed, upon a radiation-absorbing, heat-generating surface 34 on backing plate 35. This backing plate 35 with the surface 34 corresponds to the backing plate 25 with its heat-generating surface 25a. In this connection, it is contemplated that 25 and 25a, where employed, may be extended in area to provide plate 35, and surface 34 where employed. In this arrangement the perforated credit card 10 may be used with a perforated slide bar 30a.

To facilitate the positioning of the slide bars 30 I may provide the nubs 36 and/or the depressions 37 which may be engaged by a pencil, a stylus, or the like. Alternatively the slide bars 30 may be provided with notches (not shown) opposite each number whereby the slide bar can be engaged with the stylus at the number corresponding to the amount to be printed and drawn downwardly to a stop 39. In the event that the stylus used for manipulating the notched slide bars 30 and 30a includes a lead pencil tip, then a permanent mark is placed on the sales ticket 11, the length of which corresponds to the amount to be printed. This feature minimizes the possibility of alteration at some time after sale.

Photoelectric and/or magnetic means may be provided in reader 13. Such readers scan the data presented by the ray-printed record and alternatively (a) punch individual tabulating cards (or the sales tickets themselves) in predetermined positions with reference to their marginal edges in the usual manner—the tabulating cars thus being provided with control-perforations corresponding to a predetermined scheme of classification to designate the account number, the amount of sale, and such other information as may be desired—or (b) transfer the data to other machine media such as magnetic tape. These techniques, being well known to those skilled in this art, will not be described in more detail here.

Periodically, customer statements are produced by the card handling machine 14 and such statement together with the original signed sales tickets may then be returned to the customer 20 by mail. It is usual that the sales tickets accumulated by the service station operator can be used in lieu of cash in payment for products purchased from the company issuing the credit cards. To facilitate the proper crediting of the service station operator's tickets, I may provide a visual and/or coded identification of the service station number as indicated at 26 in Figure 3.

It will be apparent from the above that I have attained the objects of my invention and have provided an integrated wholly automatic credit card accounting system. Although the invention has been described with reference to preferred embodiments thereof, it is to be understood that these are by way of illustration only. Accordingly, it is contemplated that further modifications and variations can be made in the system and in the apparatus and articles used in the system without departing from the spirit and scope of the invention.

What I claim is:

1. A system for recording and classifying information which comprises a card containing repetitive and identifying information, said information being present in both visually recognized script and in coded perforations, means for manually recording information on a first invoice sheet having a thermosensitive film thereon, said manual recording means including positionable indicia having areas of high heat absorption, means for disposing said card over said invoice sheet, said sheet being over said means for manually recording, and means for exposing said sheet, said manually positionable indicia and card to radiations whereby said coded repetitive information and indicia are applied to said invoice sheet in the form of index points and visually recognized script.

2. The credit card of claim 1 wherein said coded information is in the form of coded perforations in said card and the thermal facsimile is made by exposing a thermal sensitive sheet through said coded perforations in said card.

3. The credit card of claim 1 wherein the coded information is represented by areas of high-heat absorption, and thermal facsimile is made by juxtaposing the card and an accounting sheet carrying a thermal sensitive film, and exposing the juxtaposed card and sheet to radiant heat of an intensity and for a time for said areas to generate radiant heat sufficient to form dark index points on said sheet corresponding to said coded information.

4. A credit card system adapted for recording sales information on a thermal-sensitive form which comprises a credit card containing repetitive and identifying indicia, said indicia being present in both visually recognizable script and in code and comprising areas of differential heat absorptive characteristics and being adapted for reproduction on a thermal-sensitive film, a form comprising a sales ticket including a supported thermal-sensitive film, a printer adapted to receive said credit card and said form and provided with positionable indicia having areas of high heat absorption, said positionable indicia being adapted to record non-repetitive sales information on said form, and radiant heat producing means for simultaneously exposing said form through said credit card and above said positionable indicia, said card and said positionable indicia being juxtaposed to different portions of said form during such exposure to said radiant heat.

5. In a credit card system adapted for use in service stations and the like, the improvement which includes a customer credit card containing repetitive and identifying information, said identifying information being present in a form suitable for reproduction on a thermal-sensitive film, a form comprising a sales ticket and a duplicate thereof, each comprising a supported thermal-sensitive film, a printer adapted to receive said credit card and said form and provided with means adapted to record non-repetitive sales information on said thermal-sensitive film, a heat producing source adapted to radiate the heat necessary to reproduce on said thermal-sensitive film said identifying information and said sales information without the need for transcription when said form, said card and said means adapted to record said sales information are juxtaposed and exposed to said heat source.

6. A credit card system adapted for recording and classifying information on a thermal-sensitive film which system consists essentially of a credit card containing repetitive and identifying information, said identifying information being present in a form suitable for reproduction on a thermal-sensitive film, a form comprising a sales ticket and a duplicate thereof, each comprising a supported thermal-sensitive film, a printer adapted to receive said credit card and said form and provided with means adapted to record non-repetitive sales information on said thermal-sensitive film, a heat producing source adapted to radiate the heat necessary to reproduce on said thermal-sensitive film said identifying information and said sales information without the need for transscription when said form, said card and said means adapted to record said sales information are juxtaposed and exposed to said heat source.

7. The credit card system of claim 6 wherein said identifying information is carried by said card in the form of index points of radiation-absorbing material, and said means adapted to record said sales information on said thermal-sensitive film are figures of radiation-absorbing material.

8. The credit card system of claim 6 wherein said identifying information is carried by said card in the form of perforated figures, and said means adapted to record said sales information on said thermal-sensitive film are perforated figures.

9. A credit card system adapted for recording and classifying information on a thermal-sensitive film which system comprises a credit card containing repetitive and identifying information, said information being present in a form suitable for reproduction on a thermal-sensitive film, a form comprising a sales ticket and duplicate thereof, each comprising a thermal-sensitive film on a paper backing, a printer adapted to receive said credit card and said form, a heat producing source adapted to radiate the heat necessary to reproduce on said thermal-sensitive form said identifying information when said form and said card are juxtaposed in said printer and exposed to said heat source.

References Cited in the file of this patent

UNITED STATES PATENTS

| | | |
|---|---|---|
| 2,697,649 | Roth | Dec. 21, 1954 |
| 2,740,896 | Miller | Apr. 3, 1956 |
| 2,742,631 | Rajchman et al. | Apr. 17, 1956 |